United States Patent
Leigh et al.

(10) Patent No.: US 9,581,767 B2
(45) Date of Patent: Feb. 28, 2017

(54) OPTICAL BLIND-MATE CONNECTOR AND ADAPTER

(71) Applicant: HEWLETT PACKARD ENTERPRISE DEVELOPMENT LP, Houston, TX (US)

(72) Inventors: Kevin B Leigh, Houston, TX (US); George D Megason, Spring, TX (US); Arlen L Roesner, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/915,833

(22) PCT Filed: Sep. 30, 2013

(86) PCT No.: PCT/US2013/062576
§ 371 (c)(1),
(2) Date: Mar. 9, 2016

(87) PCT Pub. No.: WO2015/047380
PCT Pub. Date: Apr. 2, 2015

(65) Prior Publication Data
US 2016/0195681 A1    Jul. 7, 2016

(51) Int. Cl.
*G02B 6/38* (2006.01)
*G02B 6/42* (2006.01)

(52) U.S. Cl.
CPC ......... *G02B 6/3825* (2013.01); *G02B 6/3818* (2013.01); *G02B 6/3849* (2013.01);
(Continued)

(58) Field of Classification Search
CPC .. G02B 6/3818; G02B 6/3825; G02B 6/3882; G02B 6/3893; G02B 6/428; G02B 6/3849; G02B 2006/4297
(Continued)

(56) References Cited

U.S. PATENT DOCUMENTS 4,611,887 A     9/1986  Glover et al.
5,363,460 A *  11/1994  Marazzi ............... G02B 6/3825
                                                                385/55
(Continued)

FOREIGN PATENT DOCUMENTS

JP      2003315624      11/2003
JP      2005345844      12/2005
(Continued)

OTHER PUBLICATIONS

The International Search Report and the Written Opinion of the International Searching Authority for PCT/US2013/062576 dated Jun. 26, 2014; 11 pages.

*Primary Examiner* — Akm Enayet Ullah
*Assistant Examiner* — Michael Mooney
(74) *Attorney, Agent, or Firm* — Hewlett Packard EnterprisePatent Deparmtent

(57) ABSTRACT

Described are examples of optical blind-mate connector adaptors, optical blind-mate connectors to blind-mate to the adaptors, and optical blind-mate systems. In various implementations, an optical blind-mate connector adapter may include a sleeve, a shutter mounted on a pivot at an opening of the sleeve to move between a closed position and an open position extending into the sleeve, and a cantilever spring anchored to a wall of the sleeve and including a free end extending toward the opening of the sleeve to urge the shutter to the closed position.

20 Claims, 12 Drawing Sheets

(52) U.S. Cl.
CPC ......... *G02B 6/3882* (2013.01); *G02B 6/3893* (2013.01); *G02B 6/428* (2013.01); *G02B 6/3885* (2013.01); *G02B 2006/4297* (2013.01)

(58) Field of Classification Search
USPC ..................................................... 385/53–78
See application file for complete search history.

(56) References Cited

U.S. PATENT DOCUMENTS

| | | |
|---|---|---|
| 6,079,881 A | 6/2000 | Roth |
| 6,688,780 B2 | 2/2004 | Duran |
| 6,845,210 B2 | 1/2005 | Ohbayashi et al. |
| 7,942,589 B2 | 5/2011 | Yazaki et al. |
| 8,348,516 B2 | 1/2013 | Roth |
| 2006/0153504 A1 | 7/2006 | Suzuki et al. |
| 2008/0260333 A1 | 10/2008 | Roth |
| 2012/0027359 A1 | 2/2012 | Katoh |

FOREIGN PATENT DOCUMENTS

| | | |
|---|---|---|
| WO | WO-2013126068 | 8/2013 |
| WO | WO-2015047392 | 4/2015 |

\* cited by examiner

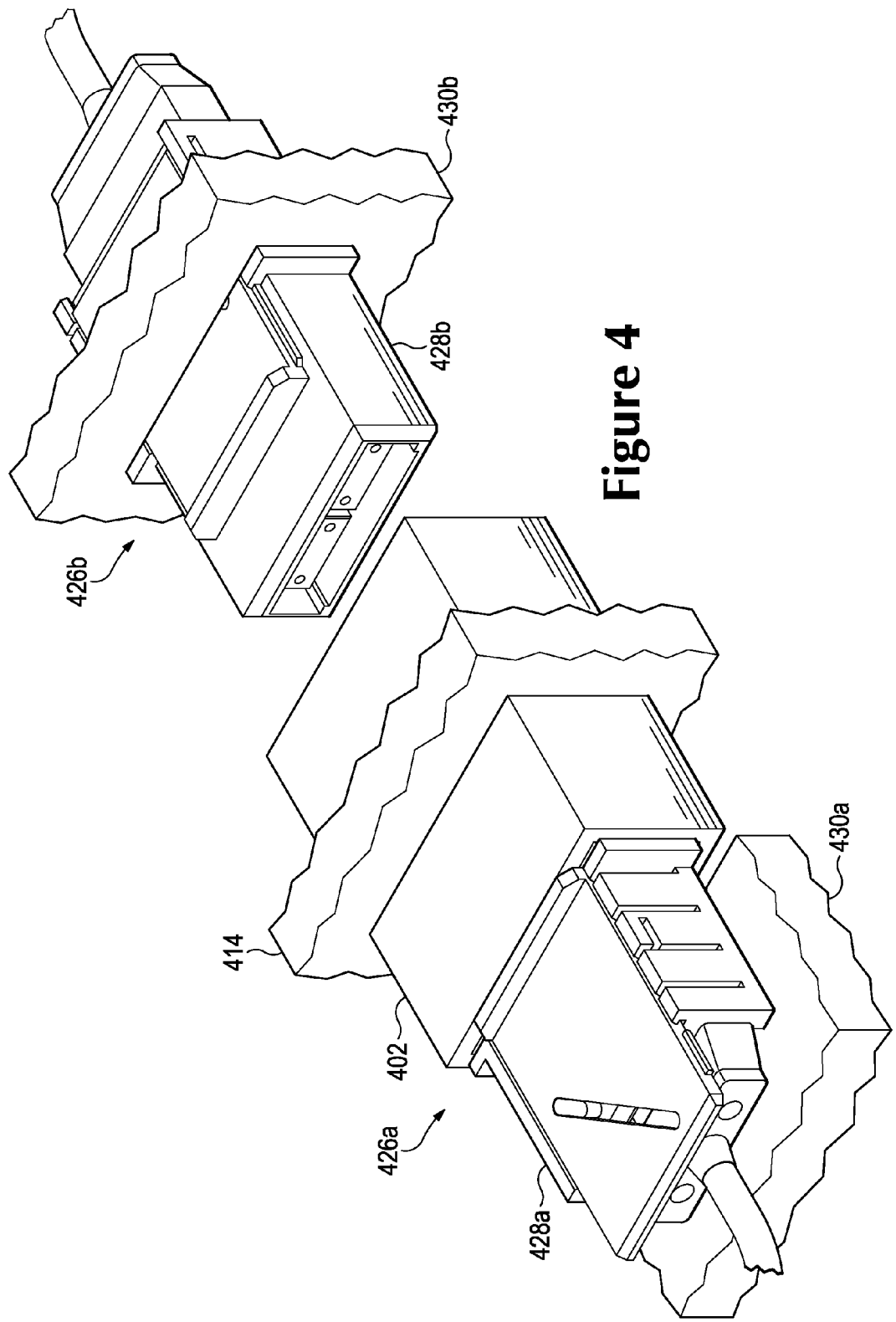

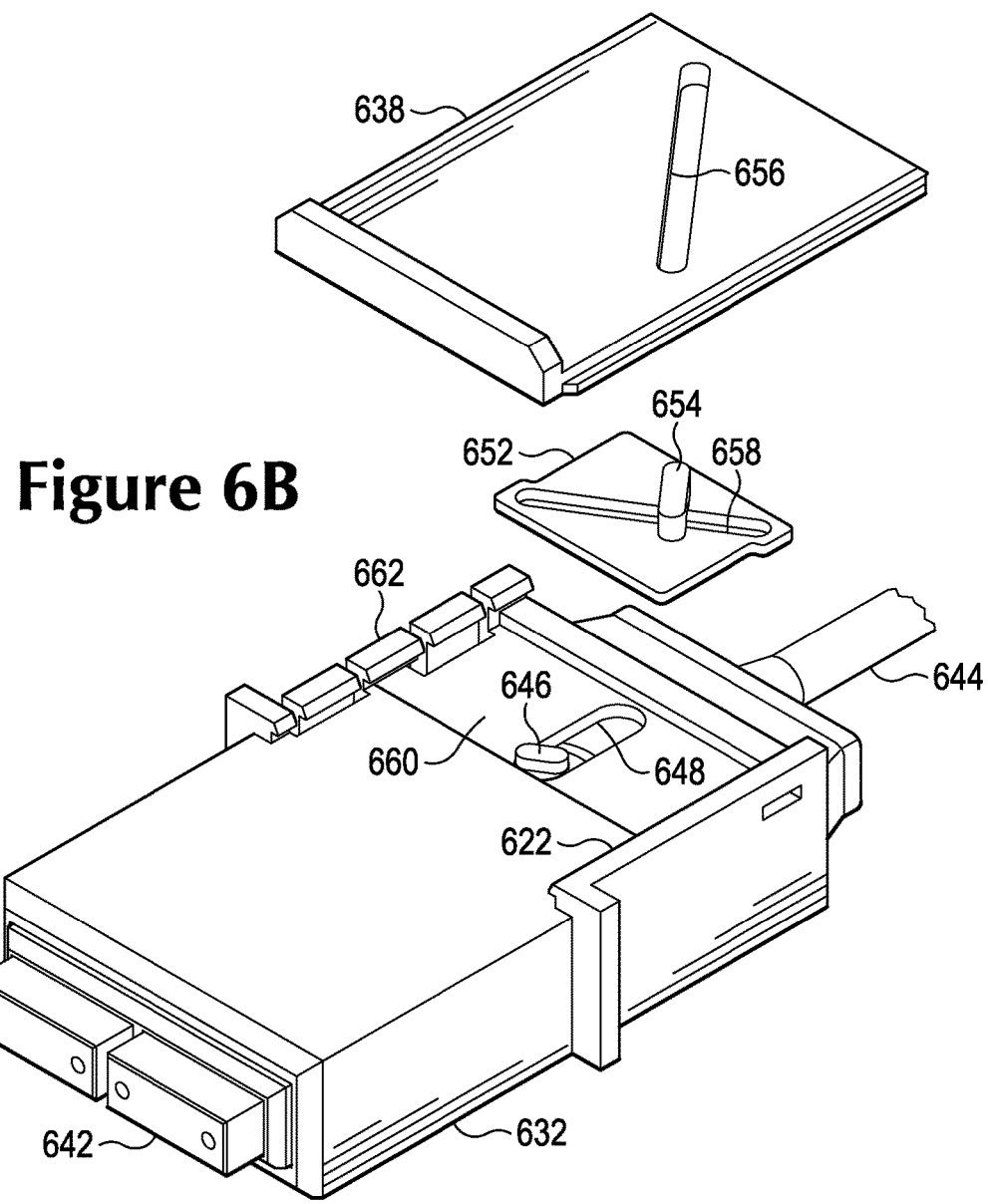

OPTICAL BLIND-MATE CONNECTOR AND ADAPTER

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector.

BRIEF DESCRIPTION OF THE DRAWINGS

The detailed description section references the drawings, wherein:

FIG. 4 illustrates a perspective view of an example optical blind-mate connector adapter and a pair of example optical blind-mate connectors;

FIG. 6B illustrates another exploded perspective view of the example optical blind-mate connector of FIG. 5A;

all in which various embodiments may be implemented.

Certain examples are shown in the above-identified figures and described in detail below. The figures are not necessarily to scale, and various features and views of the figures may be shown exaggerated in scale or in schematic for clarity and or conciseness.

DETAILED DESCRIPTION OF EMBODIMENTS

Optical transmission systems may be employed to interconnect network elements. Optical connectors include optical fibers, which may be connected end-to-end to transfer light or optical power there between. The fibers may be terminated in connector assemblies and may be mated by an adapter. Some such optical connection systems may include blind-mating connectors and adapters. In some cases, a module may include optical connectors and electrical connectors to simultaneously blind-mate to their corresponding adapters.

Optical modules are sometimes enclosed in an electronic module enclosure along with other components. Server enclosures, for example, may include a plurality of bays that house individual blade servers, optical modules, power supply modules, among other components. Often, fans and other cooling components may be provided as electronic systems may tend to generate a large amount of heat.

In some electronic module enclosure arrangements, an optical module may be coupled to another optical component via an optical blind-mate adapter. Air flow leakage, however, may tend to occur, particularly when no optical modules are connected to an adapter of the mid-plane or when only one optical module is connected to an adapter. In addition, the adapter openings may allow dust to infiltrate the system or accumulate into an optical fiber contact end when an optical module is absent on the other side of the adapter. Furthermore, there is a possibility of eye safety issues for human operators when an optical module is absent on the other side of the adapter.

Described herein are optical blind-mate connector adapters, optical blind-mate connectors, and optical blind-mate systems to provide air flow management, dust management, and eye safety. In various implementations, an optical blind-mate connector adapter may include a shutter mounted on a pivot at an opening of a sleeve to move between a closed position and an open position extending into the sleeve, and a cantilever spring anchored to a wall of the sleeve and including a free end extending toward the opening of the sleeve to urge the shutter to the closed position. In various implementations, the optical blind-mate adapter may connect to an optical blind-mate connector including a housing to push the shutter to an open position and an actuator plate to engage an end edge of the connector adapter and slide along the housing to cause an end of an optical ferrule assembly to extend from the housing as the optical connector is inserted into the connector adapter.

Figure 1:
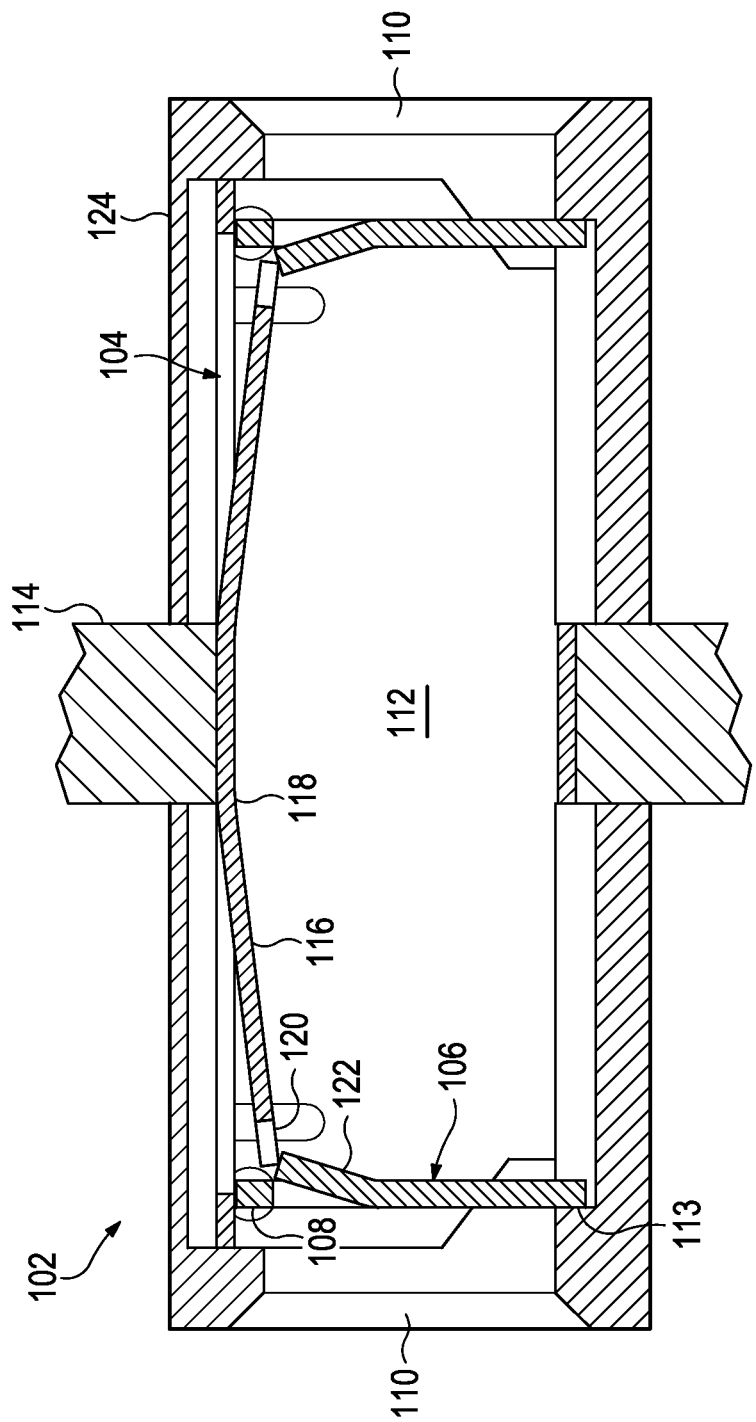
FIG. 1 illustrates a cross-section view of an example optical blind-mate connector adapter.

Turning now to FIG. 1, illustrated is an example apparatus including an optical blind-mate connector adapter 102. The optical blind-mate connector adapter 102 may be configured to blind-mate to an optical connector, as described more fully herein.

Figure 2:
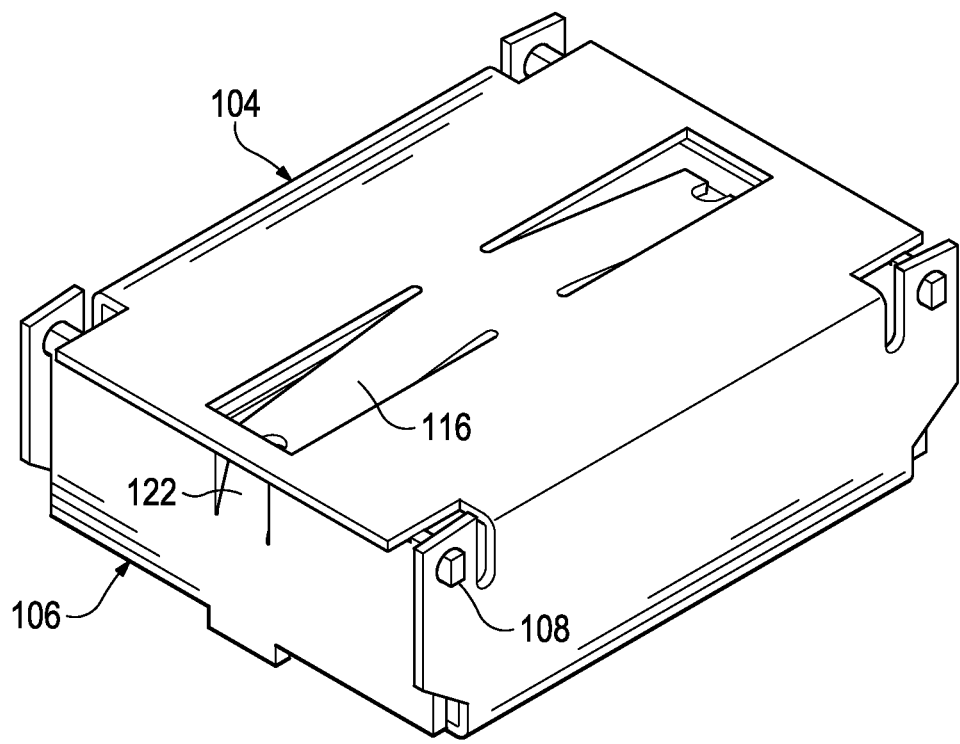
FIG. 2 illustrates a perspective view of an example sleeve for an optical blind-mate connector adapter.

As illustrated, the optical blind-mate connector adapter 102 may include a sleeve 104 having a shutter 106 mounted on a pivot 108 at an opening 110 of the sleeve 104, which is illustrated in further detail in FIG. 2. The shutter 106 may be pivotable about the pivot 168 to move between a closed position and an open position extending toward an interior 112 of the sleeve 104. In various implementations, the sleeve 104 may include a pair of shutters 106 disposed at distal ends of the sleeve 104, illustrated.

The sleeve 104 may comprise any suitable material, though in many implementations the sleeve 104 may comprise metal. Although other materials may be similarly suitable, metal may allow the sleeve 104 to be more durable and/or simpler to fabricate. In various implementations, the sleeve 104 may include shaped features to facilitate aligning an optical blind-mate connector (not shown here) within the sleeve 104.

In some implementations, the outside facing surface of the shutter 106 may include a film (not shown), which may provide additional dust protection. In some of these implementations the film may be oversized to help further seal around the perimeter of the shutter 106. In some other implementations, the inside facing surface of the shutter 106 may be coated, pasted, or painted with material, or shaped, to prevent optical signal reflection. In various implementations, the shutter 106 may abut against a shutter rest 113 when the shutter 106 is in the closed position. In some of these implementations, the shutter rest 113 may be configured such that the shutter 106 abuts against at least one edge of the shutter 106 when the shutter 106 is in the closed position and may further help seal the interior 112 of the sleeve 104 against dust.

The optical blind-mate connector adapter 102 may include a cantilever spring 116 to urge the shutter 106 to the closed position, as illustrated. The cantilever spring 116 may include an anchor end 118 anchored to a wall of the sleeve 104 and a free end 120 angled away from the wall of the sleeve 104 and extending toward the opening 110. The shutter 106 may include a tab 122 facing the interior 112 of the sleeve 104. The free end 120 of the cantilever spring 116 may engage the tab 122 to urge the shutter 106 toward the closed position.

Although the cantilever springs 116 shown in the drawings are generally depicted as aligned to each other, solid uniformly shaped, and centered on the wall of the sleeve 104, other configurations and geometries may be possible, and in some instances. For example, in various implementations, the cantilever springs 118 may be tapered, slotted, or have another geometry, any of which may impact a stress on the cantilever spring 116 in the biased state. In various implementations, the cantilever springs 116 may be longer or shorter than that shown, in still further implementations, the cantilever springs 118 may be offset from each other, and may still extend toward a center of the shutter 106, and in at least of these implementations, this configuration may allow for longer cantilever springs 116, which may be less stressful on the cantilever springs 116 than for shorter cantilever springs 116. In yet further implementations, the cantilever springs 116 may include a free end 120 extending toward one of the shutters 106 and an anchor end 118 that is close to the other one of the shutters 106, which may also allow for longer cantilever springs 116.

In various implementations, the optical blind-mate connector adapter 102 may be mounted onto a circuit board or stationary plane, such as, for example, a mid-plane board 114, shown in partial view in FIG. 1, and may allow optical modules to couple through the adapter 102, which will be described and shown in more detail herein. The integrated shutters 108 may provide for restriction of air-flow, dust, and/or light (e.g., from a fiber optic cable) through the adapter 102, independently on each side of the adapter 102, particularly when only optical module is inserted into the adapter 102 or when no optical modules are inserted into the adapter 102.

Figure 3:
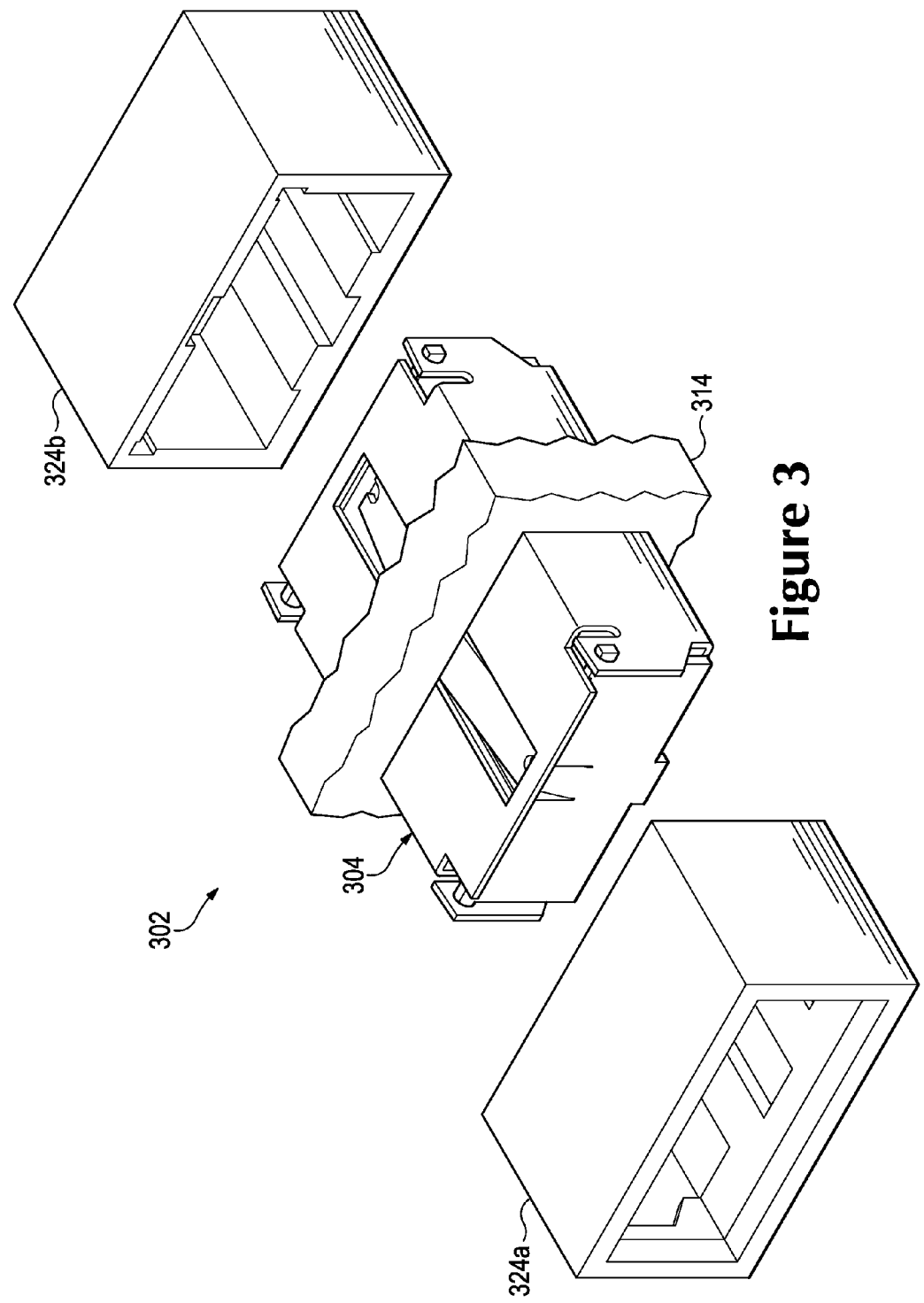
FIG. 3 illustrates an exploded perspective view of an example optical blind-mate connector adapter.

The sleeve 104 may be disposed, at least in part in a housing 124. In some implementations, the sleeve 104 may be integrally-formed to the housing 124. In some implementations, and as illustrated in FIG. 3, an optical blind-mate connector adapter 302 may include a sleeve 304 within a housing comprising a first housing end 324a at a first side of the mid-plane 314 and a second housing end 324b at a second side of the mid-plane 314. In various implementations, separate housing ends 324a, 324b may allow the hole in the mid-plane board 314 to be smaller than would otherwise be the case for implementations including a unitary housing. In these implementations, the hole in the mid-plane board 314 may just need to accommodate the size of the sleeve 304, with the housing ends 324a, 324b slipped onto the ends of the sleeve 304 protruding from the mid-plane board 314. For example, in some implementations, the hole in a mid-plane board may have a dimension of about 18 mm×10 mm Various implementations of the optical blind-mate connector adapter described herein may be constructed with less complexity as compared to apparatuses including many separate moving components. For example, in some implementations, an optical blind-mate connector adapter may comprise cantilever springs that are integrally formed to the sleeve and the shutters may be the only moving parts (aside from the biasing of cantilever springs). In this manner, the sleeve may have the shutters installed thereon and then stockpiled for later assembly to the housing ends.

In addition, the simple design of the optical blind-mate connector adapter may allow for the optical blind-mate connector adapter to be made more compactly than one fabricated in a more complex manner. A more compact optical blind-mate connector adapter may consequently mean that the hole in the mid-plane board onto which the adapter is mounted may also be made smaller. In some implementations in which the housing for the optical blind-mate connector adapter comprises two separate housing ends, the hole in the mid-plane board may made even smaller as the hole may just need to accommodate the size of the sleeve, as described above. In many implementations, a smaller hole in the mid-plane board may reduce the impact on trace routing. In some other implementations, the sleeve may integral beams similar to the cantilever springs (not shown) protruding towards the outside of the walls of the sleeve to allow the sleeve to be fixedly floated in the hole of the mid-plane board.

FIG. 4 illustrates an example system including a first optical module 426a, which may be connected, to a second optical module 426b via an optical blind-mate adapter 402. An optical connector 428a of the first optical module 426a may be blind-mated to one side of the adapter 402, and an optical connector 428b of the second optical module 426b may be blind-mated to the other side of the adapter 402. The adapter 402 may be mounted onto a stationary plane or mid-plane circuit board 414, and the connectors 428a, 428b may each be mounted onto respective circuit board 430a or module bulkhead mounting panel 430b to form the optical modules 426a, 426b respectively. In some implementations, one or both of the optical modules 426a, 426b may comprise a system module, and in some implementations, the system module may include high-power active components. In various implementations, one of the optical modules 426a, 426b may comprise a system module while the other one of the optical modules 426a, 426b may comprise a connectivity module with a few or no active components. In various implementations, the planes of the circuit board 430a and mounting panel 430b of the optical modules 426a, 426b may be oriented orthogonally to each other, as illustrated, or may be parallel to each other. In various ones of these implementations, the planes of the circuit board 430a or mounting panel 430b of the optical modules 426a, 426b may be oriented orthogonally or parallel to the mid-plane circuit board 414.

Although not illustrated, the mid-plane circuit board 414 may include an electrical blind-mate adapter in addition to the optical adapter 402. In various implementations, the optical modules 426a, 426b may include electrical connectors (not shown) in addition to the optical connectors 428a, 428b, and the electrical connectors may be configured to simultaneously blind-mate with the electrical adapter(s) of the mid-plane circuit board 414.

Figure 5A:
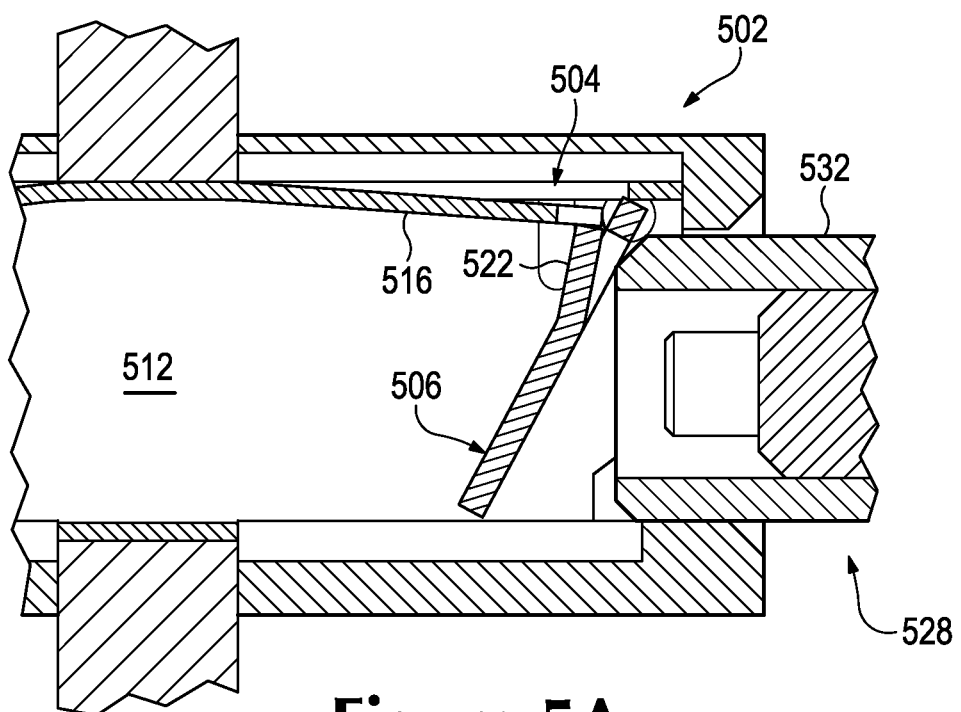
FIG. 5A and FIG. 5B illustrate cross-section views of an example optical blind-mate connector being inserted into an example optical blind-mate connector adapter.
Figure 5B:
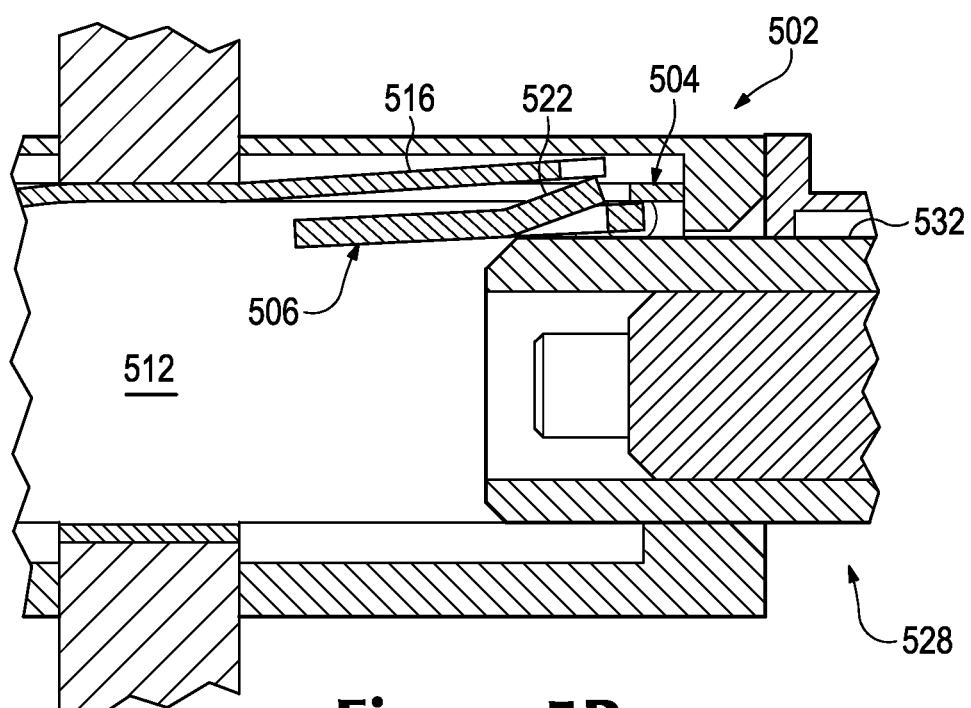

FIGS. 5A and 5B illustrate cross-section views of an example optical blind-mate connector adapter 502, and an example optical blind-mate connector 528 being inserted into the adapter 502. As illustrated in FIG. 5A, as the connector 528 is inserted into the adapter 502, the leading edge of the housing 532 pushes against the shutter 506 from the outside of the sleeve 504, partially opening the shutter 506. As the connector 528 is inserted further into the sleeve 504, as shown in FIG. 5B, the shutter 506 is pushed all the way towards the interior 512 of the sleeve 504. As shown, the tab 522 of the shutter 506 pushes against the cantilever spring 516. In this biased state, the cantilever spring 516 will urge the shutter 506 to the closed position when the connector 528 is retracted from the adapter 502.

Figure 6A:
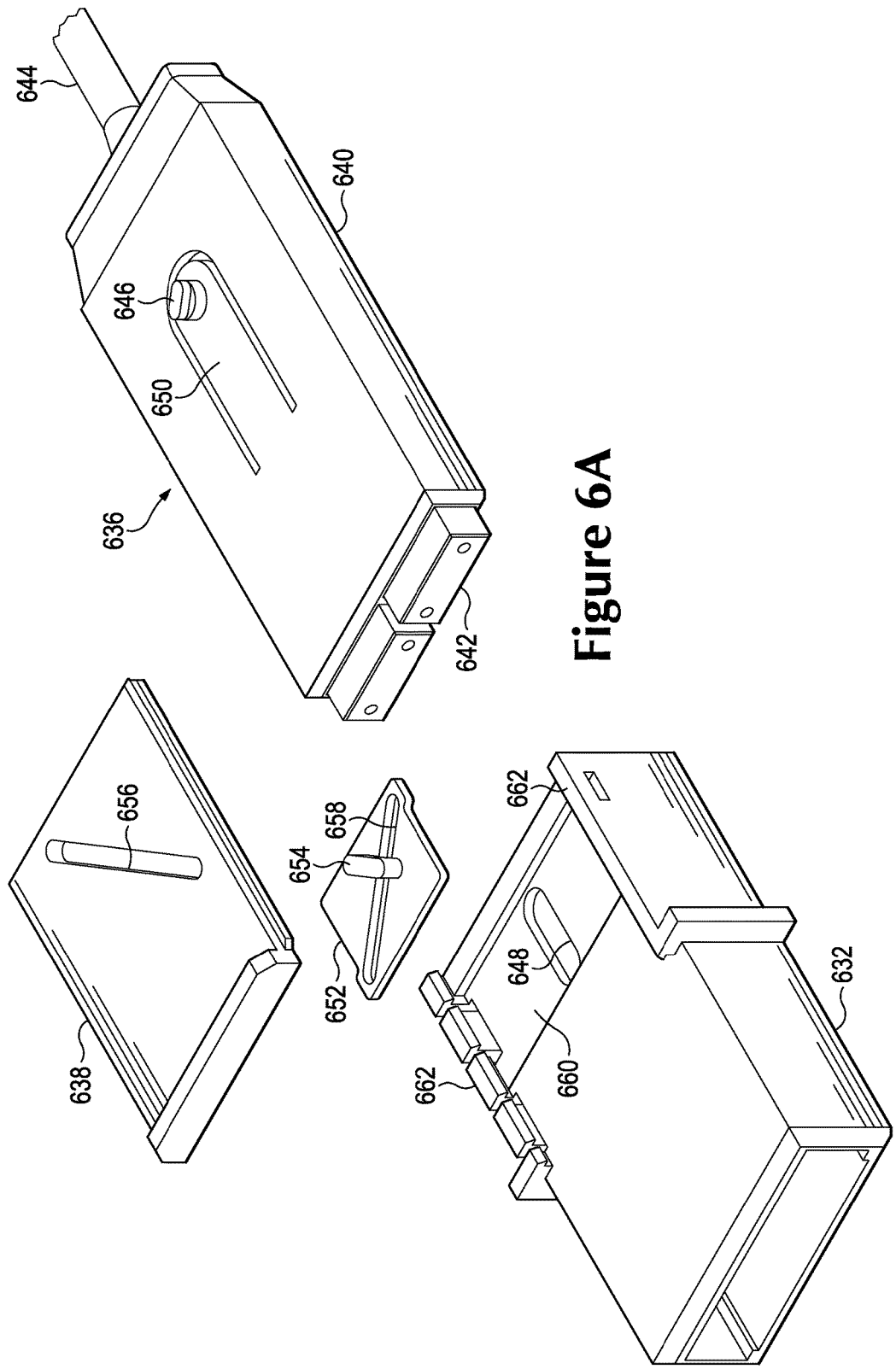
FIG. 6A illustrates an exploded perspective view of an example optical blind-mate connector.
Figure 6C:
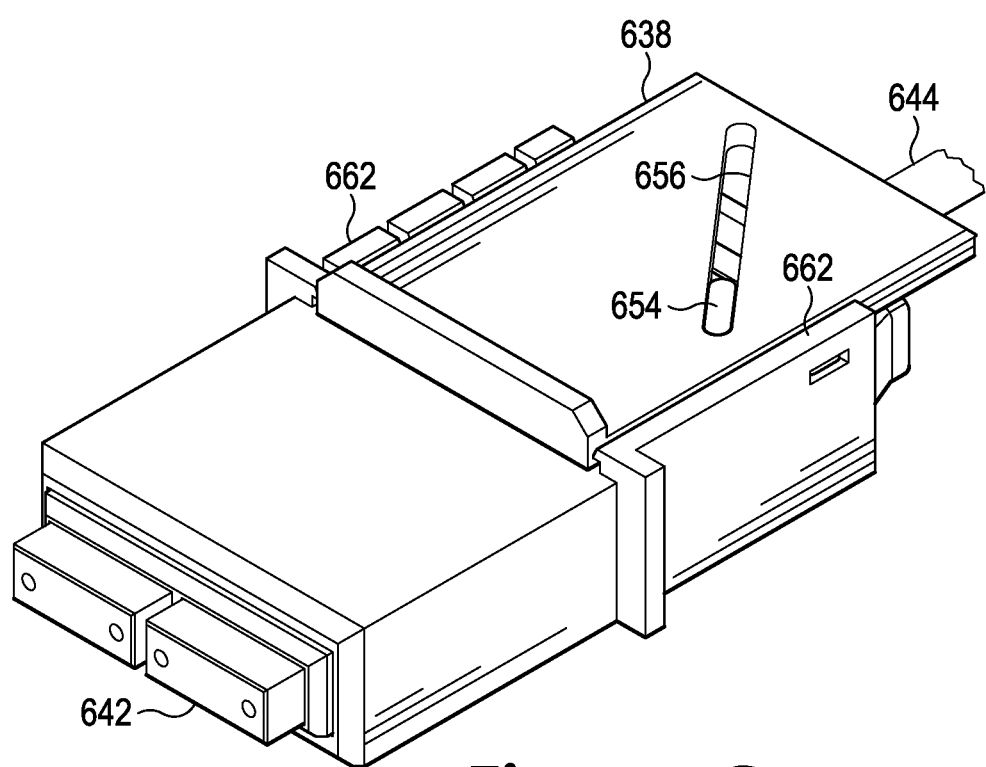
FIG. 6C illustrates a perspective view of the example optical blind-mate connector of FIG. 6A as assembled.

FIGS. 6A-6C illustrate various views of an example blind mate connector. In particular, FIGS. 6A and 6B illustrate exploded views of the connector, and FIG. 6C illustrates a perspective view of an assembled connector. As illustrated, the connector includes a housing 632, an optical ferrule assembly 636, and an actuator plate 638, all in sliding arrangement with each other. The optical ferrule assembly 636 may include a ferrule carrier 840 including at least one ferrule 642 holding a plurality of optical fibers 644.

The optical ferrule assembly 636 may include a knob 646 on a surface of the ferrule carrier 640 to mate with a slot 648 in the housing 632. The knob 646 and the slot 648 may be complementarily configured such that the knob 646 can slide within the slot 648 to move the optical ferrule assembly 636 between a retracted position and an extended position with respect to the housing 632. As shown, the knob 646 may be mounted on a spring beam 650 to facilitate insertion of the optical ferrule assembly 836 into the housing 632.

The connector may further include a slide plate 652 disposed between the actuator plate 638 and the housing 632. The slide plate 652 may include a tab 654 to slidably nest within a slot 656 in the actuator plate 638, and the slide plate 652 may include a slot 658 in which the knob 646 on the optical ferrule assembly 636 may slide nest. When assembled as shown in FIG. 6C, the Ode plate 652 (shown in FIG. 6B) may move transversely to the actuator plate 636 within a slide groove 660 when the actuator plate 638 slides along the slide rails 662 on the housing 632, and the movement of the slide pate 852 may in turn cause a movement (e.g., retraction or extension) of the optical ferrule assembly 636 (shown in FIG. 6A) as the slide plate 652 pushes against the knob 646 (shown in FIG. 6B) of the optical ferrule assembly 636.

Figure 7A:
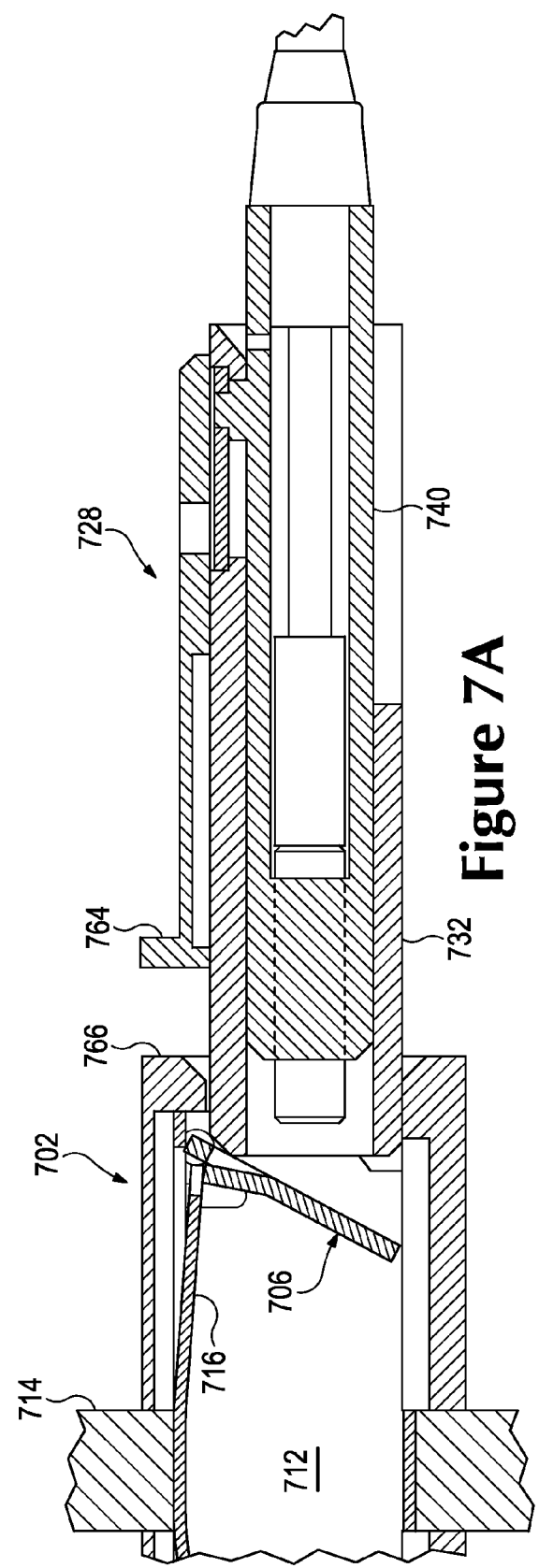
FIGS. 7A-7C illustrate cross-section views of an example optical blind-mate connector being inserted into an example optical blind-mate connector adapter.
Figure 7B:
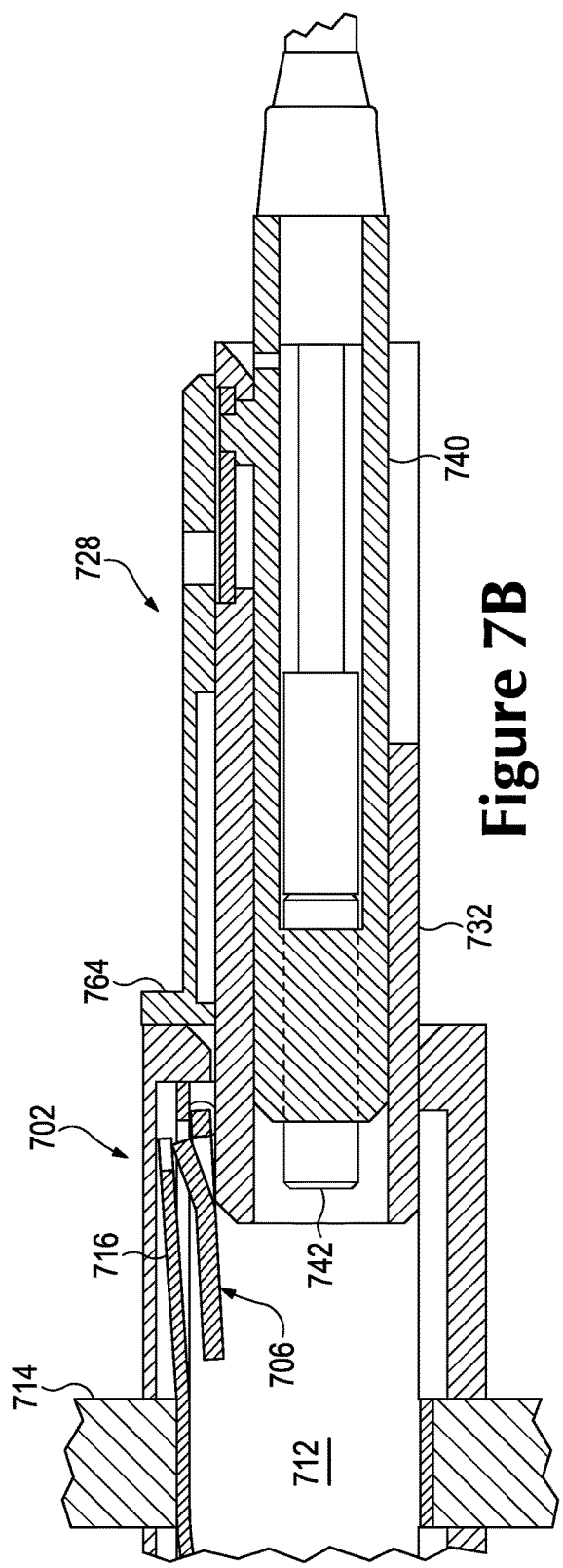
Figure 7C:
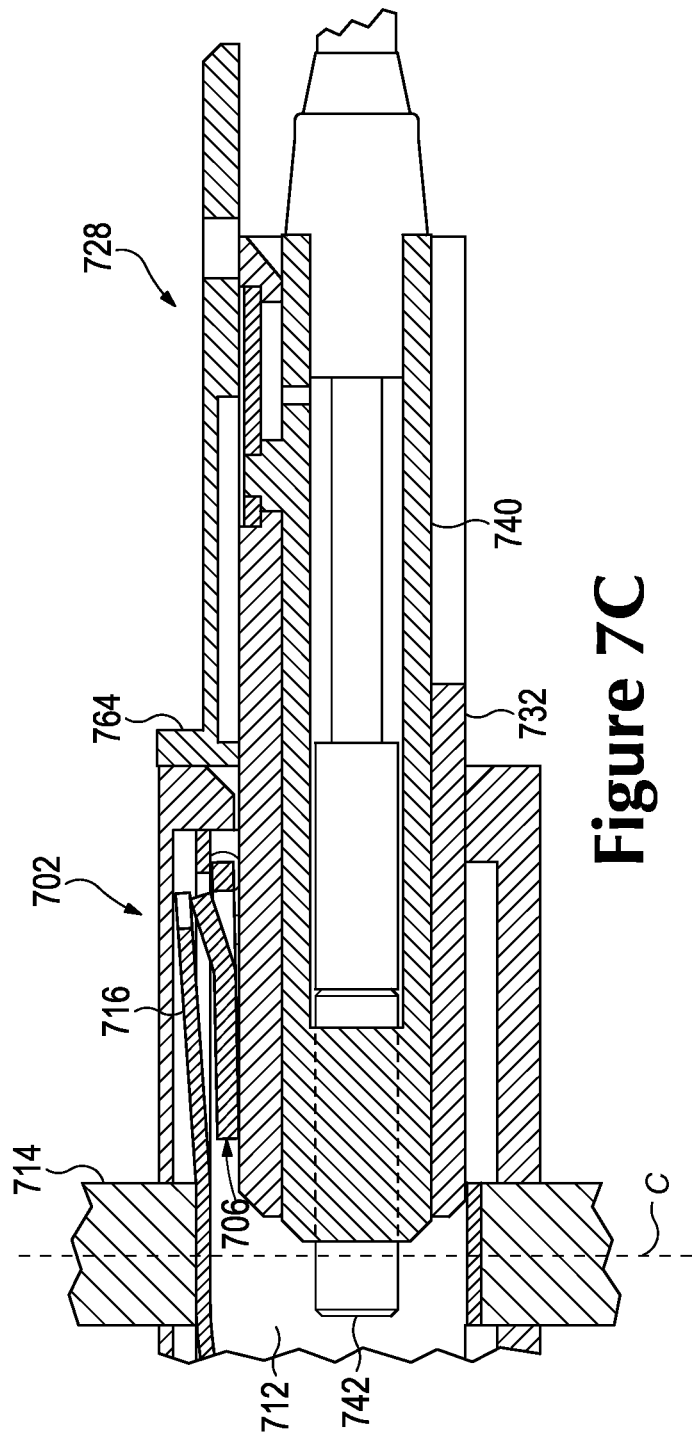

FIGS. 7A-7C illustrate cross-section views of an example optical band-mate connector 728 being inserted into an example optical blind-mate connector adapter 702. As the connector 728 is inserted into the adapter 702, the leading edge of the housing 732 of the connector 728 pushes against the shutter 706 of the adapter 702, partially opening the shutter 706. As the connector 728 is inserted further into the adapter 702, the shutter 706 continues to be pushed all the way towards the interior 712 of the adapter 702, biasing the cantilever spring 716. In this biased state, the cantilever spring 716 will urge the shutter 706 to the closed position when the connector 728 is retracted from the adapter 702.

When the connector 728 is inserted in the adapter 702, a tab 764 of the actuator plate 738 engages an end edge 766 of the adapter 702. As the connector 728 is inserted further into the adapter 702, the actuator plate 738 is pushed backward and slides along the housing 732 of the connector 728 to cause an end of the ferrule(s) 742 to extend from the housing 732 as the connector 728, as shown in FIG. 7C.

In various implementations, the ferrule 742 may extend beyond the center line, C, of the mid-plane circuit board 714 when the connector 728 is fully inserted into the adapter 702, as shown in FIG. 7C. In various ones of these implementations, when an opposing connector not shown) is inserted fully into the adapter 702, the ferrules 742 may be compressed back into their respective ferrule carriers 740. In this arrangement a positive mating force may be provided between opposing mated ferrules 742 to ensure adequate optical coupling between the connectors 728.

Various aspects of the illustrative embodiments are described herein using terms commonly employed by those skilled in the art to convey the substance of their work to others skilled in the art. It will be apparent to those skilled in the art that alternate embodiments may be practiced. With only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, wellknown features are omitted or simplified in order not to obscure the illustrative embodiments. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein, it is manifestly intended, therefore, that embodiments be limited only by the claims and the equivalents thereof.

What is claimed is:

1. An apparatus to optically blind-mate to an optical module, the apparatus comprising:
   a sleeve;
   a shutter mounted on a pivot at an opening of the sleeve to move between a closed position and an open position extending into the sleeve, the shutter including a tab facing an interior of the sleeve; and
   a cantilever spring anchored to a wall of the sleeve and including a free end extending toward the opening of the sleeve to engage the tab to urge the shutter to the closed position.

2. The apparatus of claim 1, wherein the cantilever spring is anchored to the wall of the sleeve at an anchor end, and wherein the free end urges the shutter toward the closed position.

3. The apparatus of claim 2, wherein the free end is angled away from the wall to engage the tab to urge the shutter toward the closed position.

4. The apparatus of claim 1, wherein the opening is a first opening disposed at a first distal end of the sleeve, and wherein the apparatus includes another shutter mounted at a second opening disposed at a second distal end of the sleeve.

5. The apparatus of claim 1, further comprising a housing, wherein the sleeve is disposed within the housing.

6. The apparatus of claim 5, further comprising a circuit board, and wherein the housing comprises a first housing end at a first side of the circuit board and a second housing end at a second side, opposite the first side, of the circuit board.

7. The apparatus of claim 1, wherein the apparatus is a connector adapter to blind-mate a pair of optical modules to each other.

8. An apparatus to optically blind-mate to an optical connector adapter, the apparatus comprising:
   a housing;
   an optical ferrule assembly at least partially within the housing; and
   an actuator plate slidably coupled to the housing, the actuator plate to cause an end of the optical ferrule assembly to extend from housing when the housing is inserted into the optical connector adapter.

9. The apparatus of claim 8, wherein the optical ferrule assembly is to move between a retracted position when the actuator plate is in a first position to an extended position when the actuator plate is in a second position.

10. The apparatus of claim 9, wherein the optical ferrule assembly includes a ferrule carrier holding a plurality of optical fibers and including a knob on a surface of the ferrule carrier, the knob to mate with a slot in the housing and to slide within the slot between the retracted position and the extended position.

11. The apparatus of claim 8, further comprising a slide plate disposed between the actuator plate and the housing to urge the optical ferrule assembly to extend from the housing when the actuator plate moves from a first position to a second position relative to the housing.

12. The apparatus of claim 11, wherein the slide plate includes a tab to slidably nest within a first slot in the actuator plate such that the slide plate is to move transversely to the actuator plate when the actuator plate moves from the first position to the second position, and wherein the optical ferrule assembly includes a knob extending through a second slot in the housing to slidably nest within a third slot in the slide plate such that the optical ferrule assembly moves between a retracted position when the actuator plate is in the first position to an extended position when the actuator plate is in the second position.

13. A system comprising:
a connector adapter including a sleeve, a shutter pivotable between a closed position and an open position extending into an interior of the sleeve, and a cantilever spring along a wall of the sleeve to urge the shutter to the closed position; and
an optical connector to blind mate to another optical connector through the sleeve, the optical connector including a housing, an optical ferrule assembly at least partially within the housing, and an actuator plate, the housing to push the shutter to an open position and the actuator plate to engage an end edge of the connector adapter and slide along the housing to cause an end of the optical ferrule assembly to extend from the housing as the optical connector is inserted into the sleeve.

14. The system of claim 13, wherein the housing, the optical ferrule assembly, and the actuator plate are in sliding arrangement with each other.

15. The system of claim 13, wherein the shutter is a first shutter mounted at a first opening of the sleeve, and wherein the connector adapter includes a second shutter mounted at a second opening of the sleeve, opposite the first opening, the second shutter to pivot from a closed position to an open position extending into an interior of the sleeve when the other optical connecter is inserted into the sleeve through the second opening.

16. The apparatus of claim 1, wherein the shutter includes a film to provide dust protection.

17. The apparatus of claim 16, wherein the film seals around a perimeter of the shutter.

18. The apparatus of claim 1, wherein the shutter is coated with a material to prevent optical signal reflection.

19. The apparatus of claim 1, comprising:
a shutter rest, wherein the shutter rests against the shutter rest when the shutter is in the closed position.

20. The apparatus of claim 1, wherein the cantilever spring is tapered.

* * * * *